Patented Jan. 1, 1952

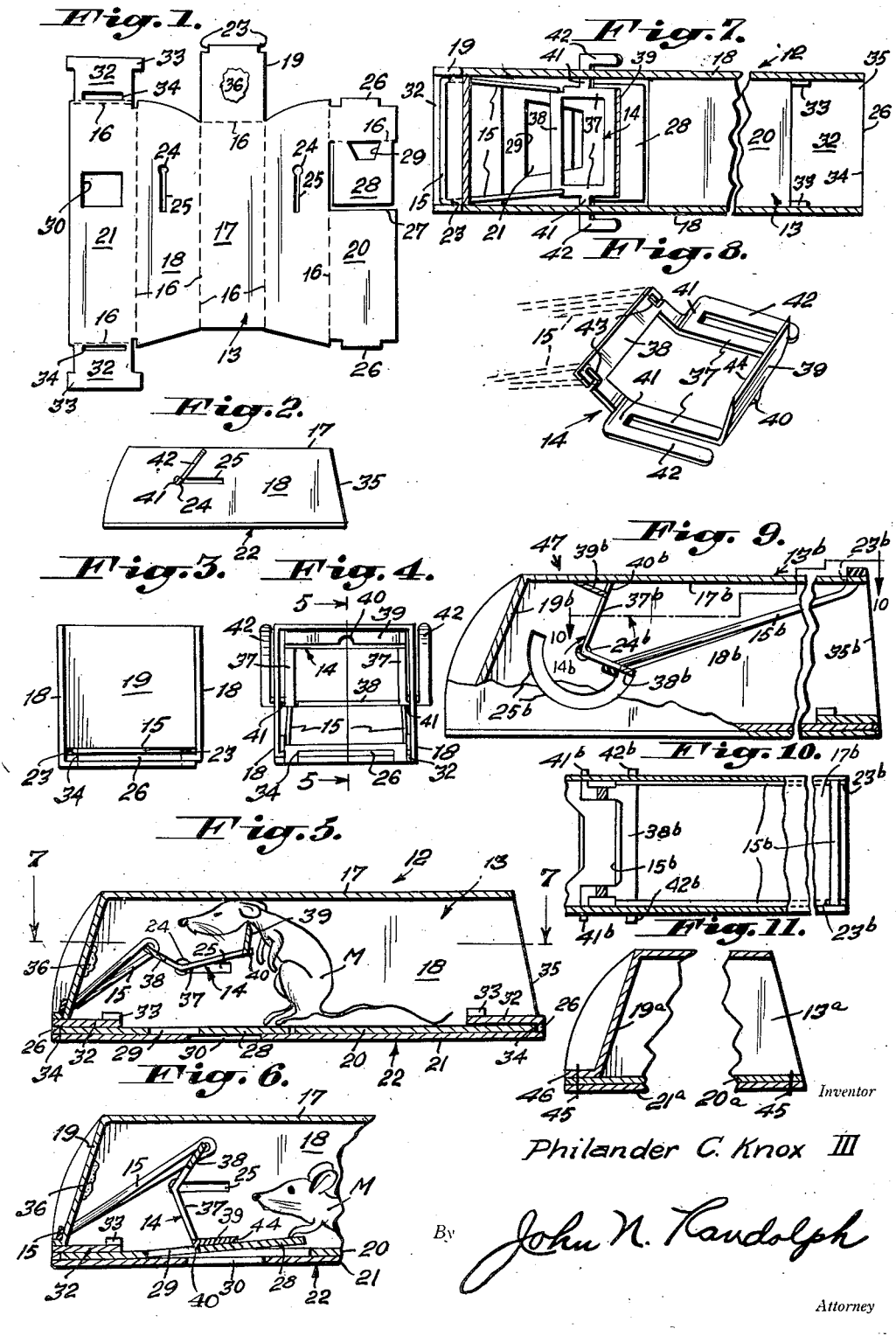

2,581,327

UNITED STATES PATENT OFFICE 2,581,327

RODENT TRAP

Philander C. Knox, III, De Land, Fla.

Application June 28, 1950, Serial No. 170,769

12 Claims. (Cl. 43—82)

This invention relates to a novel construction of rodent trap and more particularly one intended primarily for use in catching and killing mice and has for its primary object to provide a disposable trap which may be manufactured and sold at such a low cost that it may be used but once and after a mouse has been caught therein the trap may be disposed of in a trash or garbage receptacle without removing the mouse therefrom.

Another object of the invention is to provide a trap in which the mouse will be killed and retained in a concealed position within the trap housing or casing.

Still a further and important object of the invention is to provide a trap which is absolutely safe and which is so constructed that it is impossible for a child or adult to place his or her hand or finger in a position so as to be struck by the trap jaw should the trap be inadvertently released and wherein the hands need not be placed within the trap for the purpose of setting the trap.

Still a further object of the invention is to provide a trap composed of a minimum number of parts and of maximum simplicity enabling the trap to be very economically fabricated yet providing a trap of ample strength and durability to accomplish its intended result.

Another object of the invention is to provide a trap which will not require baiting and which in spite of its simplicity of construction is of ample strength to humanely kill a small rodent such as a mouse.

Still a further object of the invention is to provide a trap which will be extremely effective in accomplishing its intended result in that a new trap will be utilized each time and therefore will possess a minimum of human odor which tends to frighten away mice and all of which odor will be confined to the outside of the trap.

Various other objects and advantages of the invention will hereinafter become more fully apparent from the following description of the drawing, illustrating presently preferred embodiments thereof, and wherein:

Figure 1 is a plan view of a blank constituting a part of the preferred form of the invention;

Figure 2 is a side elevational view illustrating the assembled trap;

Figure 3 is an enlarged end elevational view looking from left to right of Figure 2 and illustrating the rear or closed end of the trap;

Figure 4 is an end elevational view on an enlarged scale looking toward the opposite or front end of the trap;

Figure 5 is an enlarged longitudinal substantially central sectional view taken along a plane as indicated by the line 5—5 of Figure 4 showing the trap in a released position and with a mouse caught therein;

Figure 6 is a fragmentary longitudinal vertical sectional view, similar to Figure 5 but showing the trap in a set position;

Figure 7 is a horizontal sectional view of the trap taken substantially along a plane as indicated by the line 7—7 of Figure 5;

Figure 8 is an enlarged perspective view of the trap jaw;

Figure 9 is a longitudinal sectional view, partly in side elevation, illustrating a modified form of the trap in a released position;

Figure 10 is a fragmentary sectional view, partly in top plan, of a portion of the trap of Figure 9, taken substantially along a plane as indicated by the line 10—10 of Figure 9, and Figure 11 is a fragmentary longitudinal vertical sectional view of a portion of a modified form of trap casing.

Referring more specifically to the drawing, and first with reference to the embodiment of the invention as illustrated in Figures 1 to 8, the rodent trap in its entirety, designated generally 12, is composed of a housing or casing, designated generally 13, a trap jaw, designated generally 14, and a resilient element 15 for moving the trap jaw 14 from a retracted, set position as illustrated in Figure 6 to a projected, released position as illustrated in Figures 4 and 5.

The casing or housing 13 is formed from a single blank of a suitable inexpensive material, preferably but not necessarily cardboard or said casing may be formed of metal, if desired. The blank forming the casing 13 is illustrated in detail in Figure 1 wherein the dotted lines 16 represent fold lines thereof and divide the casing blank into a top wall 17, corresponding side walls 18, an end wall 19 and side edge portions 20 and 21 of the blank which combine to form the housing or casing bottom, designated generally 22. The end wall 19 at its free end is provided with corner notches 23. The side walls 18, adjacent the ends thereof disposed nearest the end wall 19 are provided with corresponding openings 24 and longitudinally extending slots 25 which communicate with said openings 24 and extend therefrom toward the other, remote ends of the side walls 18. The bottom portion 20 is provided with restricted projections or tongues 26 at the ends thereof and is cut as seen at 27 adjacent the end thereof located nearest the end wall 19 to form a hinged tongue 28 which is secured at one end only thereof to the casing portion 20, and which is swingable on the casing portion 20 along said transverse fold edge 16 thereof which forms a hinge connection. The free end of the tongue 28 extends toward the end of the blank portion 21 disposed remote thereto and said tongue is provided with an opening 29 adjacent its hinged edge. The blank portion 21 is provided with an opening 30 which is disposed substantially in transverse alignment with the free end of the tongue 28. Each end of the blank portion 21 is provided with an extension 32 which is laterally enlarged, as seen at 33, adjacent its free end, which is foldable relatively to the blank portion 21 along a transverse fold line 16 thereof and which is provided with a transversely extending slot 34, adjacent its fold line 16.

It will be readily apparent that the blank as illustrated in Figure 1 may be folded along its longitudinal fold lines to position the sides 18 in substantially parallel relationship and the bottom portion 21 on the outer side of the bottom portion 20, as illustrated in Figures 5 and 6 and so that said portions 20 and 21 will then be disposed beneath and substantially parallel to the top portion 17. The end extensions 32 are then folded inwardly, as illustrated in Figure 5, so that their slots 34 will engage the tongues 26 and said extensions 32 are folded inwardly against the upper side of the bottom portion 20 and the lateral extensions 33, which are wider than the space between the side walls 18 will be bent upwardly thereby, as illustrated in Figure 5, for frictionally resisting any movement of the extensions 32 upwardly from their engaged positions of Figure 5 to thus retain the top, bottom and side walls in their assembled relationship as illustrated in Figures 2 to 7. The end wall 19 is then bent downwardly to close one end of the casing 13 and has its free edge bearing on the upper edge of one of the extensions 32, as illustrated in Figures 5 and 6, and is retained in this position as will hereinafter be described. The opposite end 35 of the casing 13 is open and constitutes the entrance end of the trap 12. The end wall 19 preferably has an artificial bait containing a cheese aroma as seen at 36 imprinted, adhered or otherwise secured to its inner surface.

The trap jaw, designated generally 14, as best illustrated in Figure 8 is formed from a metal blank or stamping and has two parallel side bars 37 which are connected at corresponding ends thereof by a cross bar 38 and which are connected at their opposite ends by an impaling bar or blade 39. The blade 39 is disposed at substantially a right angle to the plane of the adjacent portions of the bars 37 and is provided intermediate of its ends and at its inner or back edge with an integral detent or projection 40 which extends at an angle therefrom and which is disposed substantially in the same plane as the adjacent portions of the bars 37. The bars 37 near but spaced from the cross bar 38 are each provided with an outwardly projecting portion forming a trunnion 41 and a lever 42 extends from the outer end of each trunnion 41 at a right angle thereto. The bars 37 are bent adjacent the trunnions 41 so that the cross bar 38 and the end portions of the bars 37, located adjacent thereto, are disposed at an obtuse angle to the remainder of the bars 37. The corners of the trap jaw 14 formed by the ends of the cross bar 38 and the contiguous ends of the bars 37 are provided with angular notches 43 which open outwardly of the outer side edges of the bars 37.

Before the casing 13 is completely assembled, as previously described, from the blank as illustrated in Figure 1, the trap jaw 14 is inserted between the side walls 18 and the levers 42 are passed outwardly through the slots 25, so that the trunnions 41 will then engage and be journaled in the openings 24. The resilient element 15 preferably comprises a rubber band or an equivalent elastic member looped end portions of which are engaged in the notches 43. The doubled intermediate portion of the band 15 is then drawn outwardly through the open adjacent end of the trap casing 13 and the end wall 19 is then swung downwardly to close said end of the casing and said looped intermediate portion of the band is positioned across the outer side of the bottom edge of the wall 19 and has portions thereof extending inwardly through the notches 23, as best illustrated in Figure 3, so that the elasticity of the band 15 will urge the trap jaw 14 to swing counterclockwise as seen in Figures 5 and 6 toward and beyond its position of Figure 5 and normally to its position of Figure 4. However, it will be readily apparent that other resilient means in lieu of the resilient element 15 may be utilized such as a contractile spring or springs.

Assuming that the trap is in its position of Figures 2 and 4, one or both of the levers 42 is manually engaged and swung downwardly in a clockwise direction, as seen in Figure 2 for rotating the jaw 14 clockwise as seen in Figures 5 and 6 until the jaw 14 is in or slightly beyond its position of Figure 6. The operator by then inserting a finger through the opening 30 can press the tongue or treadle 28 upwardly or inwardly of the casing 13 and against the outer side of the impaling bar 39 so that the detent 40 will be positioned in the opening 29 and engaging an end wall thereof to thereby latch or set the trap jaw 14 and with the resilient element 15 under tension. The pressure exerted by the detent 40 against the treadle 28 will retain said treadle in its raised position of Figure 6. The trap 12 thus set may be placed in any convenient position and a mouse or other small rodent M, attracted by the scent of the bait 36, will enter the casing 13 through its entrance end 35 and in approaching the bait 36 will step upon the treadle 28 to thereby displace the treadle or tongue downwardly from its position of Figure 6 to its position of Figure 5 to thus disengage the end wall of the opening 29 from the detent 40. When this occurs the resilient element 15 will forcibly swing the trap jaw 14 in a counterclockwise direction, as seen in Figures 5 and 6, so that the upper or leading edge of the impaling bar 39 which is preferably sharpened as seen at 44 and which may be toothed will strike the neck of the rodent so that the rodent will be choked between the top wall 17 of the casing and the impaling bar 39 and thus quickly and humanely killed. The dead mouse or rodent will be completely contained within the casing 13 and the trap 12 with the rodent therein may then be disposed of in a suitable trash or garbage receptacle without removing the rodent therefrom, due to the inexpensive construction of the trap making it economically feasible to thus use the trap but once.

Figure 11 illustrates a slightly modified form of trap casing or housing 13a which differs from the housing 13 only in that the extensions 26 and 32 may be omitted and the bottom portions 20a and 21a may then be connected by staples 45. The end wall 19a is also preferably provided with an outturned extension 46 which is engaged by certain of the staples 45 and in this form of the invention the notches 23 as provided in the end wall 19 and not shown in Figure 11, are spaced inwardly from said extension 46.

Figures 9 and 10 illustrate another embodiment of the trap, designated generally 47 including a casing 13b which substantially corresponds to the casing 13 and which differs therefrom in that the notches 23 are omitted from the end wall 19b and instead the top wall 17b is provided with notches 23b at the entrance end 35b of said casing.

The trap jaw 14b of the trap 47 includes side portions 37b the end portions of which are disposed substantially at right angles to one another. The impaling bar 39b extends from corresponding ends of the bars 37b in the opposite direction to the other, angularly disposed portions of said bars. The bars 37b are provided at their apexes with outwardly projecting trunnions 41b which extend through and are journaled in transversely aligned openings 24b of the side walls 18b. Said side walls 18b in lieu of the slots 25 are each provided with an arcuate slots 25b which slots are disposed concentric to the openings 24b. The cross bar 38b is provided with end portions which extend beyond the side bars 37b through the slots 25b to form handles 42b. The resilient element 15b may likewise comprise an elastic band a portion of which may extend across the outer side of the leg portions 37b adjacent the cross bar 38b thence around the outer edges of said leg portions 37b over the handle portions 42b and along the inner sides of the walls 18b. Another portion of the elastic member 15b extends across the outer side of the top wall 17b and inwardly through the notches 23b.

It will be readily apparent that either or both of the handles 42b may be manually engaged for swinging the jaw 14b in a counterclockwise direction as seen in Figure 9 against the action of the elastic member 15b until the jaw detent 40b is positioned to be latched by the tongue or treadle, not shown, corresponding to the tongue or treadle as illustrated in Figures 5 and 6. When the trap 47b is thus disposed in a set position the elastic member 15b will pass just below the trunnions 41b so that there will be only a slight pressure exerted on the jaw 14b by the resilient means 15b for urging said jaw to revolve in a counterclockwise direction as seen in Figure 9. The trap 47 is released in the same manner as the trap 12, as previously described, and as the jaw 14 commences to turn counterclockwise and to move toward its position of Figure 9, the bar portion 39 will swing downwardly relatively to the openings 24b and in so moving the end of the elastic member 15b connected to the jaw 14b will be displaced downwardly so that the elastic member 15b will exert a greater force due to leverage on the jaw 14b as the impaling bar 39b thereof approaches the top wall 17b for affording a maximum force on the jaw as the bar 39b reaches a position to strike and impale a rodent against the top wall 17b. It will be obvious that the handles 42b will move in the slots 25b as the jaw 14b is oscillated either in setting the jaw or when it is released and actuated by the elastic means 15b.

Various modifications and changes are contemplated and may obviously be resorted to, without departing from the spirit or scope of the invention as hereinafter defined by the appended claims.

I claim as my invention:

1. A rodent trap comprising an elongated casing having an open entrance end and including a bottom wall, a top wall and side walls, a trap jaw swingably disposed in said casing and journaled in said side walls including an impaling bar spaced from the journal of the jaw and disposed substantially parallel thereto, the bottom wall of said casing including an integral hinged tongue having a hinged end disposed remote to the entrance end of the casing, said tongue having an opening therein, said trap jaw having a detent projecting at an angle from the impaling bar, and resilient means anchored to a portion of the casing and connected to the jaw and urging the jaw to swing in a direction for displacing the impaling bar toward the top wall of the casing, said tongue forming a treadle and being displaceable upwardly for engaging said detent in the opening thereof for latching the jaw in a retracted set position with said resilient means under tension and the impaling bar adjacent the bottom of the casing.

2. A rodent trap as in claim 1, said resilient means being of the contractile type and being disposed in a plane located adjacent the axis of the journal of the jaw when the jaw is latched in a set position so that the resilient means will exert a relatively slight torque on the jaw when in a set position.

3. A rodent trap as in claim 1, said resilient means being of the contractile type and being disposed in a plane located adjacent the axis of the journal of the jaw when the jaw is latched in a set position so that the resilient means will exert a relatively slight torque on the jaw when in a set position, said resilient means being connected to the jaw at a point remote to its journal, said point of connection of the jaw and resilient means moving the resilient means away from the axis on which the jaw is journaled as the trap jaw is moved toward a released, impaling position whereby the torque exerted by the resilient means on the jaw will increase as the impaling bar approaches the top wall of the trap casing.

4. A rodent trap as in claim 1, said casing being formed of cardboard and having an opposite end wall located adjacent the trap jaw and provided with a bait imprinted or adhered to its inner surface.

5. A rodent trap as in claim 1, said casing being formed from a single blank of cardboard having interlocking tongue and slot portions connecting sections thereof forming the bottom wall and retaining the casing in an assembled position.

6. A rodent trap as in claim 1, said casing being formed from a single blank of cardboard having interlocking tongue and slot portions connecting sections thereof forming the bottom wall and retaining the casing in an assembled position, said blank including a downwardly and outwardly inclined end wall hinged at its upper edge and having a free edge abutting another wall of the casing to limit movement of the end wall inwardly of the casing, said end wall being provided with notches adjacent its free edge, said resilient means comprising an elastic band having a portion extending across the outer side of said end wall and through said notches for retaining said end wall in a position for closing one end of the trap casing.

7. A rodent trap as in claim 1, said casing side walls having aligned openings, said trap jaw comprising a blank having trunnions spaced from the impaling bar and journaled in the aligned openings of said side walls.

8. A rodent trap as in claim 1, said casing side walls having aligned openings, said trap jaw comprising a blank having trunnions spaced from the impaling bar and journaled in the aligned openings of said side walls, said trap jaw blank including a cross bar spaced from the impaling bar and trunnions and connected to said resilient means, at least one of said side walls having an arcuate slot disposed concentrically to the axis of said trunnions, at least one end of said cross bar engaging said arcuate slot and extending outwardly of the casing and forming a handle for swinging the jaw against the action of said resilient means toward a set position.

9. A rodent trap as in claim 1, said trap jaw being formed from a blank including trunnions spaced from said impaling bar and projecting through and journaled in said side walls, one of said trunnions having an integral lever portion disposed externally of the casing and adapted to be manually actuated for swinging the jaw to a set position against the biasing action of said resilient means, said hinged treadle and jaw being disposed remote to the entrance end of the trap casing whereby the hands and fingers may not be engaged by the trap jaw, and said treadle being displaceable inwardly from externally of the casing for latching the jaw in a set position.

10. A rodent trap comprising an elongated casing having an open entrance end and including a top wall, a bottom wall and side walls, a trap jaw swingably disposed in said casing and journaled in said side walls and including an impaling element spaced from the axis of the journal of said jaw, a treadle hinged to the bottom wall about an axis disposed transversely of the casing for swinging movement toward and away from the top wall, said treadle having a shoulder facing away from the entrance end of the casing, said impaling element having a portion forming a detent, and resilient means anchored to a portion of the casing and connected to the trap jaw for urging said jaw to swing in a direction to move the impaling element toward the top wall, said treadle being displaceable upwardly for engaging the treadle shoulder against the detent to latch the jaw in a retracted set position with said resilient means under tension and the impaling element adjacent the bottom wall.

11. A rodent trap as in claim 10, said bottom wall having an opening disposed beneath a portion of the treadle through which said treadle is adapted to be engaged and swung toward the top wall.

12. A rodent trap as in claim 10, said casing including an end wall at the end thereof, opposite to said entrance end, said end wall having one end hinged to the top wall and having a portion spaced from said hinged end bearing against at least one other wall of the casing and limiting the swinging movement of said end wall inwardly of the casing, said resilient means being anchored to said end wall and urging said end wall inwardly of the casing.

PHILANDER C. KNOX, III.

REFERENCES CITED

The following references are of record in the file of this patent:

UNITED STATES PATENTS

| Number | Name | Date |
| --- | --- | --- |
| 2,109,481 | Graybill | Mar. 1, 1938 |
| 2,448,618 | Patrick | Sept. 7, 1948 |
| 2,518,819 | Roessler | Aug. 15, 1950 |